(12) United States Patent
Haaberg

(10) Patent No.: US 7,159,917 B2
(45) Date of Patent: Jan. 9, 2007

(54) UTILITY TABLE AND TOOL STORAGE APPARATUS FOR TRUCK BEDS

(76) Inventor: Bjorn Haaberg, 15981 Viewfield Rd., Monte Sereno, CA (US) 95030

( * ) Notice: Subject to any disclaimer, the term of this patent is extended or adjusted under 35 U.S.C. 154(b) by 148 days.

(21) Appl. No.: 10/946,285

(22) Filed: Sep. 21, 2004

(65) Prior Publication Data

US 2006/0061116 A1    Mar. 23, 2006

(51) Int. Cl.
*B62D 33/02* (2006.01)

(52) U.S. Cl. ............... 296/26.09; 224/403; 224/510

(58) Field of Classification Search ........... 296/26.08, 296/26.09; 224/403, 404, 510; 108/44
See application file for complete search history.

(56) References Cited

U.S. PATENT DOCUMENTS

| | | | |
|---|---|---|---|
| 3,394,666 A | | 7/1968 | Pearlman |
| 3,661,431 A | * | 5/1972 | Wisecarver ............ 384/55 |
| 3,664,704 A | | 5/1972 | Ellis |
| 4,375,306 A | | 3/1983 | Linder |
| 4,705,315 A | * | 11/1987 | Cherry .................. 296/37.1 |
| 4,733,898 A | * | 3/1988 | Williams ............. 296/24.32 |
| 4,993,088 A | * | 2/1991 | Chudik ................... 5/118 |
| 5,090,335 A | | 2/1992 | Russell |
| 5,239,934 A | | 8/1993 | Miller et al. |
| 6,422,629 B1 | | 7/2002 | Lance |
| 6,491,331 B1 | * | 12/2002 | Fox .................. 296/26.09 |

* cited by examiner

*Primary Examiner*—Joseph D. Pape
(74) *Attorney, Agent, or Firm*—Larry D. Johnson

(57) ABSTRACT

A utility table and storage apparatus for use in vehicles such as pickup trucks having a truck bed includes three main parts: a main frame, a rail system, and a tool storage system. The main frame is made up of a frame assembly with four collapsible legs. The legs have wheels, and are adjustable in height. The main frame forms the support structure for the work table, the top of which is preferably covered by a 4 ft. by 8 ft. piece of metal, plywood, or other suitable material. When the main frame/table portion is outside the truck bed, it rests on the four legs with the wheels attached, allowing it to be moved around. The rail system consists of three components, the anchor frame, the guide frame, and the transfer frame. The anchor frame is bolted down to the bed of the truck. The guide frame guides the transfer frame during movements of the main frame, and is temporarily bolted to the anchor frame, but can be removed if needed to allow the full use of the truck bed. Bearings such as V-groove cam followers or other sliding mechanisms between the transfer frame and the main frame enable the back and forth motion and pull-out of the table. The tool storage system consists of toolboxes and storage compartments arranged in an orderly manner on the main frame/table.

15 Claims, 5 Drawing Sheets

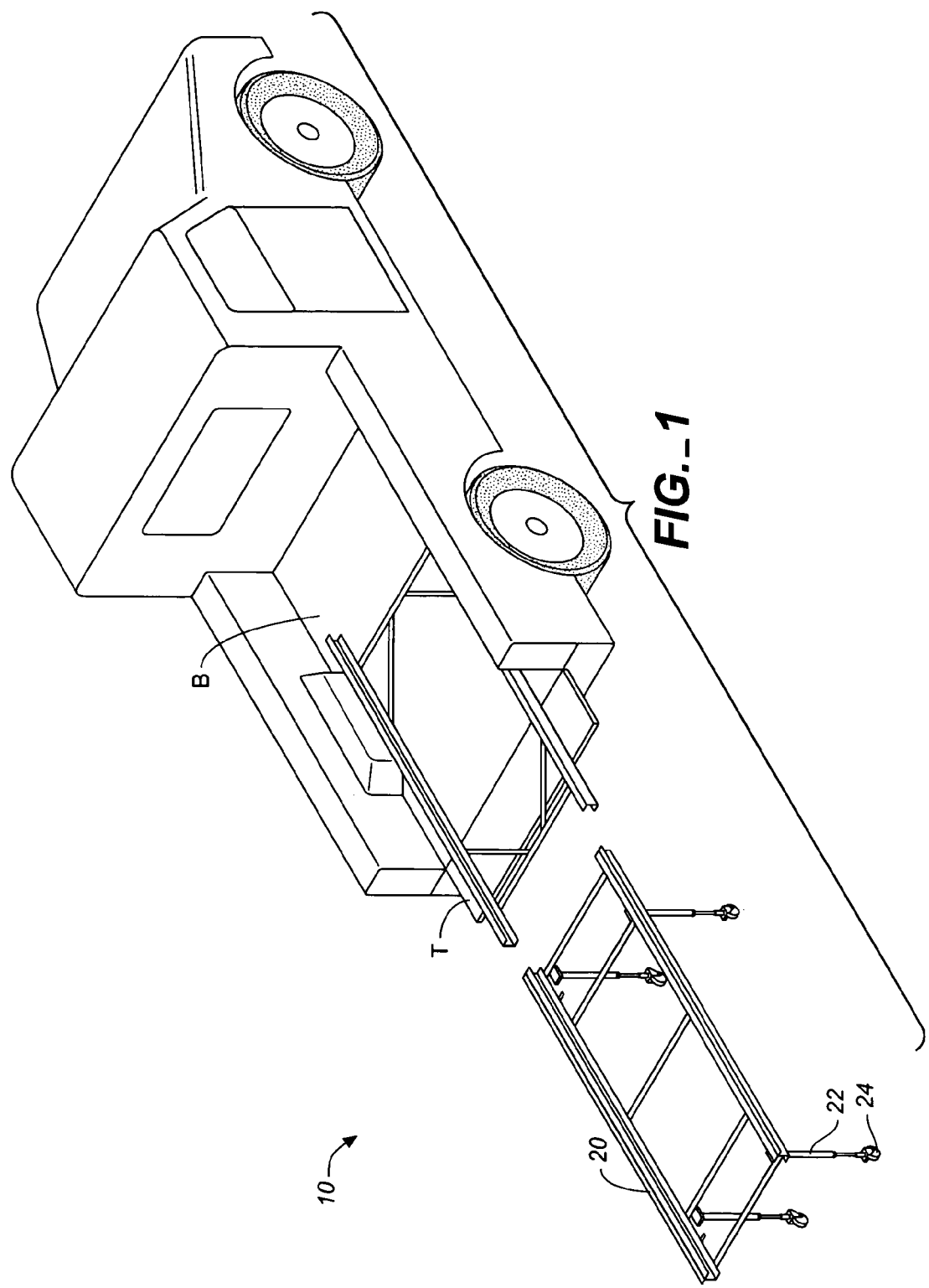
FIG._1

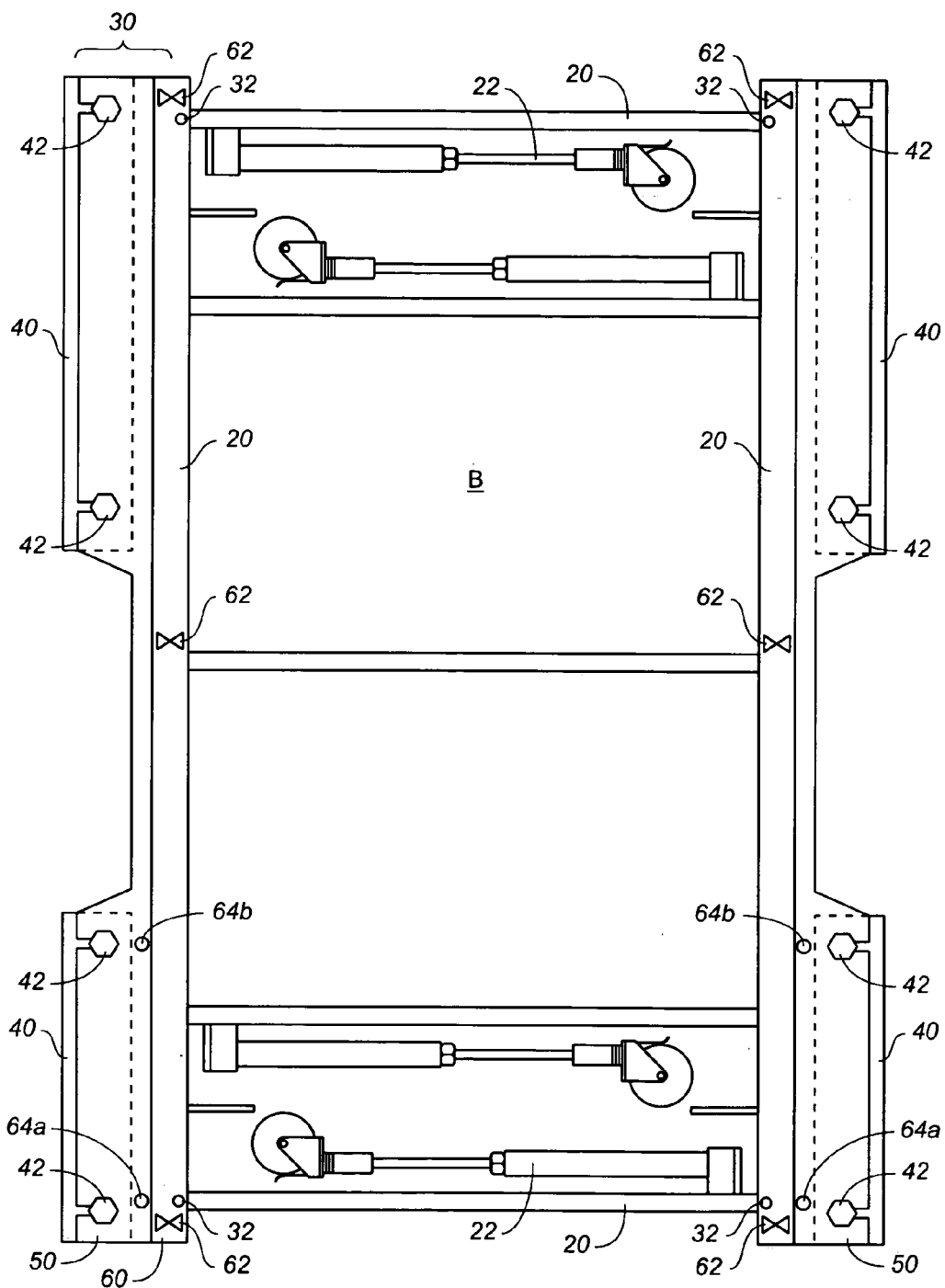
FIG._2

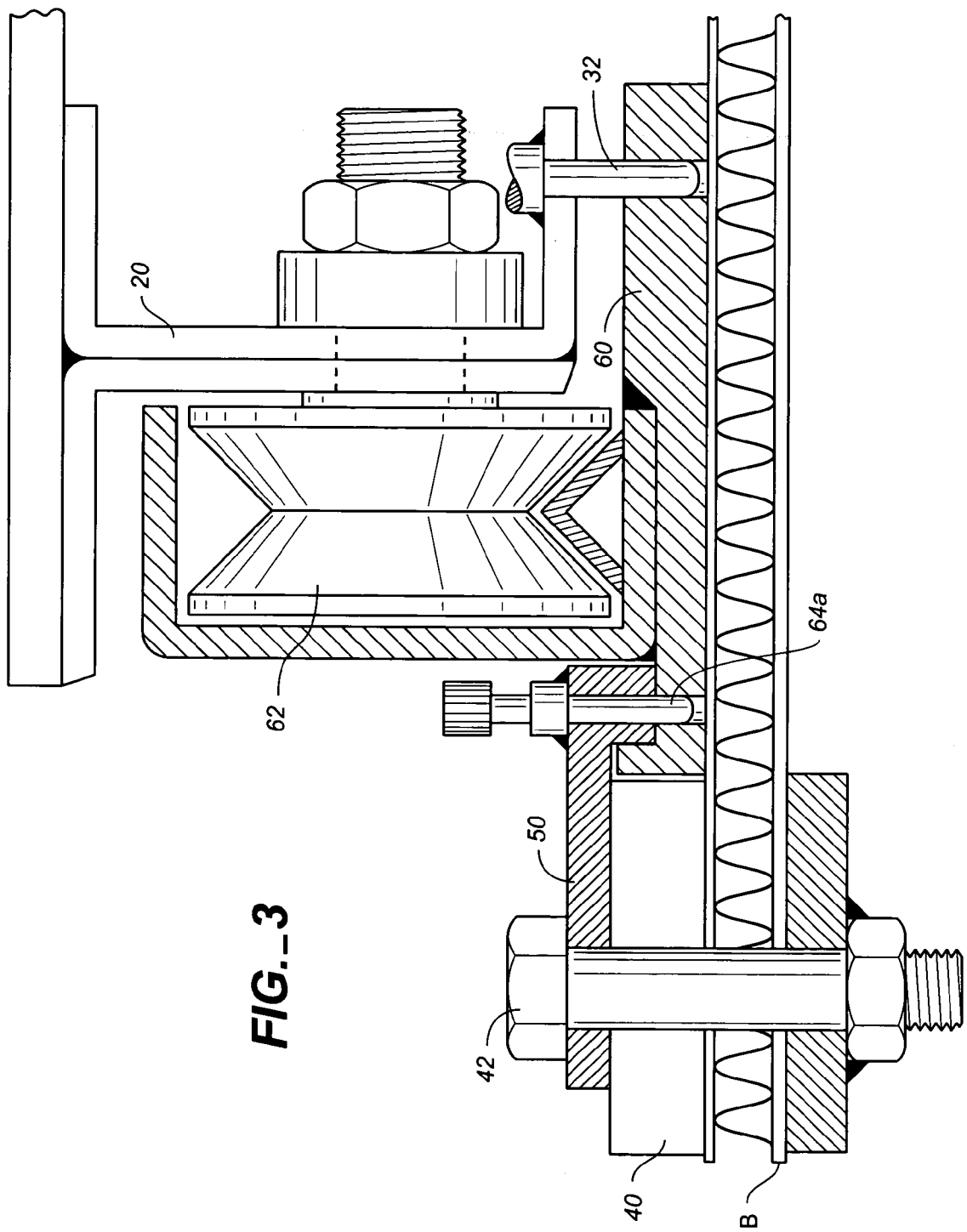
FIG._3

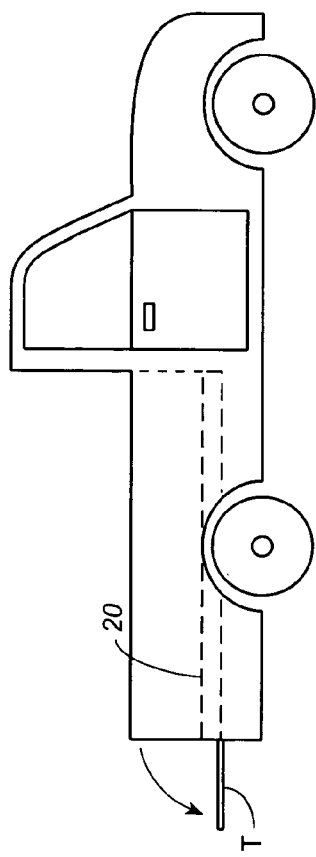
FIG._4A
FIG._4B
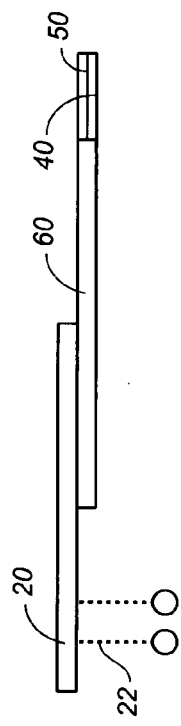
FIG._4C
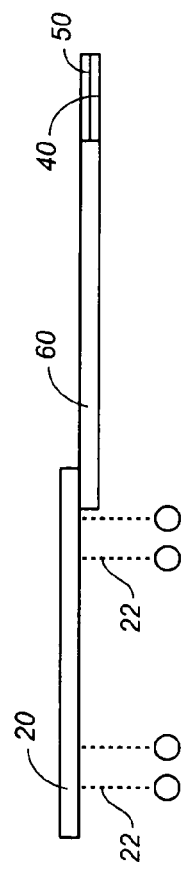
FIG._4D

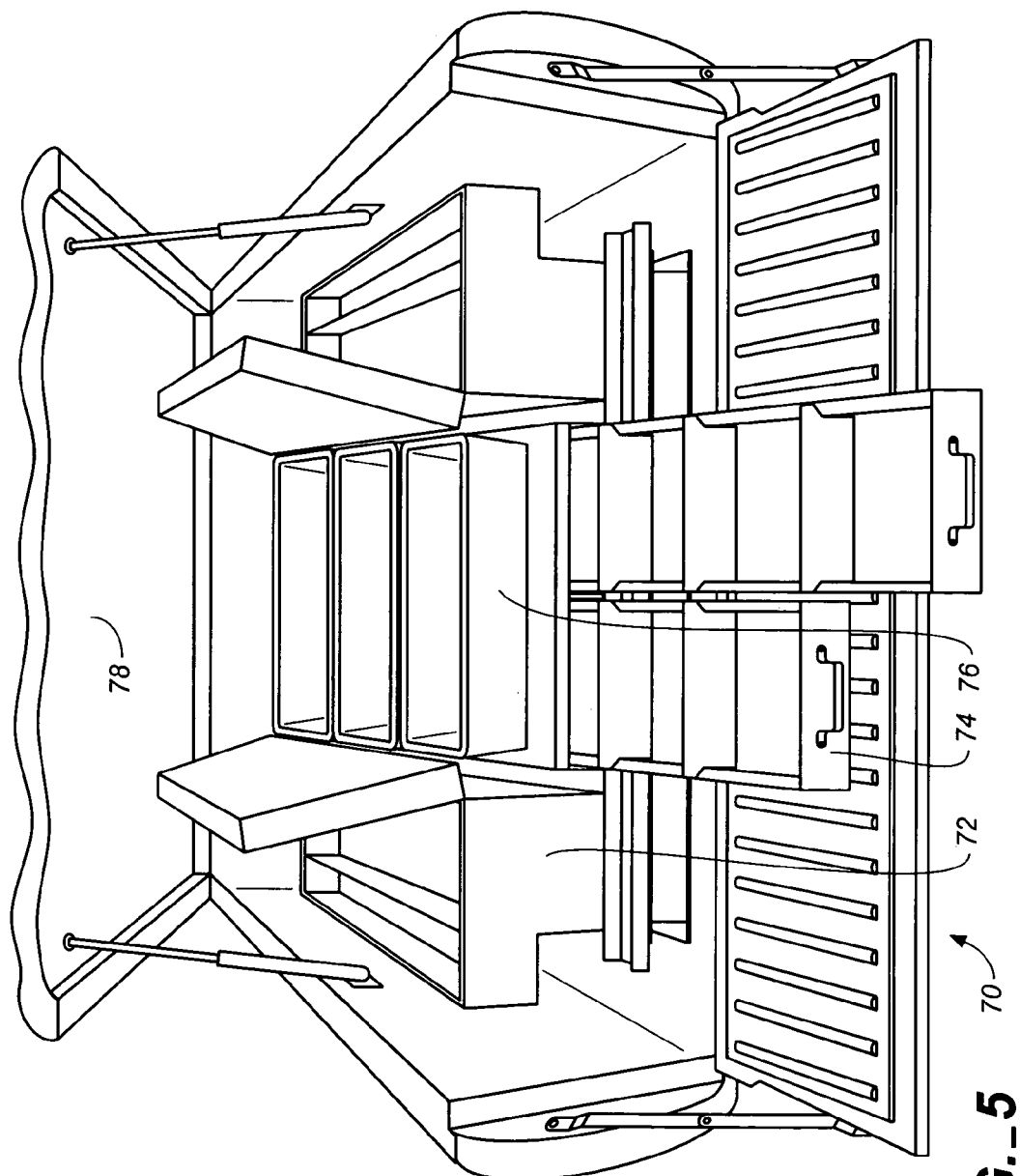
FIG._5

UTILITY TABLE AND TOOL STORAGE APPARATUS FOR TRUCK BEDS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to storage containers and work surfaces, and more particularly to an improved utility table and storage apparatus for use in vehicles such as pickup trucks having a truck bed.

BACKGROUND INFORMATION AND DISCUSSION OF RELATED ART

Many professionals and consumers use a vehicle such as a pickup truck, and may use it for multiple jobs that require transport of tools and/or work tables. Transportation, organization and access to tools and tables can be problematic. For example, some users simply place their tools in the truck bed in different containers, and use wood dividers to prevent the containers from sliding around when the vehicle is in motion. To free the truck bed for other purposes requires that all the tools and containers be removed and later put back into the bed. The same is true with stationary bolted in place toolboxes, which are cumbersome and time consuming to remove and reinstall.

Numerous devices and systems have been developed in an attempt to address these problems. Related art references known to the applicant are:

Pearlman U.S. Pat. No. 3,394,666 describes a foldable utility table having a frame for supporting a table top, a plurality of drawer storage compartments opening from opposite ends of the frame and a pair of lateral leg storage compartments on opposite sides of the frame for each housing a pair of folded legs. Each leg is pivotally secured to the frame by a pin and includes a stop member to limit pivotal movement thereof when the leg is downwardly and outwardly extended and magnetic closure means to releasably retain each leg in the extended position.

Ellis U.S. Pat. No. 3,664,704 teaches an integrated accessory group for pickup trucks wherein tool boxes, storage tanks, a cab protecting rack and other accessory units are arranged compactly in the pickup truck body and tied together so that the accessory components will not shift. The arrangement is neat and compact and does not result in a loss of truck bed length or accessibility. Space sometimes wasted fore and aft of wheel wells is utilized to advantage.

Linder U.S. Pat. No. 4,375,306 discloses a cabinet and table unit for a vehicle including an elongated plywood panel which serves as a base member for storage cabinets mounted onto the forward or inner end of the base member. The rearward or outer end portion of such base member functions as a table. A track structure is provided below the base member and supports the unit for sliding movement between a stowed position within the bed space of a pickup or the like and an extended or use position in which the table projects rearwardly from the bed space of the vehicle. The cabinets may include a pair of side cabinets which are hinge connected to a central cabinet, for movement between a storage position in which the side cabinets are in juxtaposition with each other and the central cabinet and are positioned over the table, and a use position in which the side cabinets extend laterally outwardly, in a wing fashion, from the opposite sides of the table and from the access opening for the central cabinet. A fourth cabinet may be provided endwise of the central cabinet at the innermost end portion of the base. Such inner cabinet may include a side door access which is reachable from outside of the vehicle when the unit is in its use position and the side cabinet on that side of the vehicle has been swung inwardly into its position over the table. A support leg may be provided at the rear most end of the table. Such leg may be foldable into a storage position up against the under surface of the table.

Cherry U.S. Pat. No. 4,705,315 teaches a slidable storage container which encompasses most the usable cargo space of a trade van. The shortage container is mounted on an extension track which permits an operator to fully extract the storage container through the open cargo doors so that the storage container is accessible from all sides.

Williams U.S. Pat. No. 4,733,898 describes a pickup-bed secure storage unit with a combination storage unit/auxiliary bed liner assembly adapted for nesting engagement onto the bed of a pickup truck. The storage unit covers the entire open area of the pickup bed, with the space between the auxiliary bed liner and the truck bed being partitioned to provide multiple storage compartments. A top-opening auxiliary storage compartment is formed on each side of the two rear wheel well regions. Two pull-out drawers are received within adjoining central compartments and extend substantially the entire length of the truck bed. The pull-out drawers provide secure storage compartments for tools and equipment, and also serve as work tables. The auxiliary cargo deck liner is supported by interior side panels, a central partition and engagement of saddle/bridge deck portions onto wheel well flanges.

Chudik U.S. Pat. No. 4,993,088 teaches a portable bed assembly for motor vehicles for use on a pickup truck, camper, station wagon or other recreational vehicle includes an elongate framework having a width designed to fit between rear wheel wells on a motor vehicle, and a length which fits snugly within the vehicle when the rear thereof is closed. The portable bed is mounted on rollers which ride on rails mounted on the original deck or bed of the motor vehicle. The framework includes a pair of foldable leg assemblies with one mounted on each end of the portable bed assembly. A locking mechanism maintains the portable bed assembly in mounted position along the rails on the original motor vehicle bed or rear deck. When the locking mechanism is released and the rear of the motor vehicle is opened, or the tailgate is positioned horizontally, the portable bed assembly will roll outwardly of the back of the motor vehicle. The rearmost of the foldable leg assemblies may be unfolded to a vertical position when the portable bed is positioned partially out of the truck deck.

Russell U.S. Pat. No. 5,090,335 discloses a table for use in the bed of a truck, a generally rectangular table approximately the size of the truck bed, and designed to normally repose in the truck bed. This novel table has a forward portion and a rearward portion, and a series of rollers on its underside such that when the truck has been parked, the table can be extended rearwardly to a desired extent from the bed of the truck. In the interests of providing stability to the table, the forward portion of the table can be readily caused to enter into a locking relationship with a rearward portion of the truck bed, such that the table can then serve, by virtue of its relationship to the truck, as a particularly stable means upon which detailed work can be conducted. This new table also has a series of hingedly mounted legs on its underside, which can be selectively utilized to provide ample support for the table when it has been deployed in a position in which it is at least partially extended from the bed of the truck.

Miller et al. U.S. Pat. No. 5,239,934 discloses a portable work table for being removably positioned within a storage compartment of a vehicle and includes a frame having an upper wall with a generally planar top surface, side walls extending from the upper wall and a bottom wall extending between the side walls. A plurality of legs are movably mounted on the frame and are movable between a first position such that the legs extend from the bottom surface for being engaged with a support surface such that the frame is positioned above the support surface to permit work to be readily carried out on the top surface and a second position such that the legs are retracted from the first position towards the bottom surface such that the frame is positionable within the storage compartment of the vehicle. A plurality of objects are movably mounted on the frame. A storage device is interconnected between the frame and each of the objects for allowing each object to move with respect to the top surface of the frame between a first position such that the object is positioned within the interior of the frame below the top surface and a second position such that the object is positioned at least partially above the top surface of the frame.

Miller et al. U.S. Pat. No. 5,329,979 teaches a method of removing and/or inserting a portable table from and into a storage compartment of a vehicle which includes a frame having an upper wall with a generally planar top surface, side walls extending from the upper wall and a bottom wall extending between the side walls. A plurality of legs are movably mounted on the frame and are movable between a first position such that the legs extend from the bottom surface for being engaged with a support surface such that the frame is positioned above the support surface to permit work to be readily carried out on the top surface and a second position such that the legs are retracted from the first position towards the bottom surface such that the frame is positionable within the storage compartment of the vehicle. A plurality of objects are movably mounted on the frame. A storage device is interconnected between the frame and each of the objects for allowing each object to move with respect to the top surface of the frame between a first position such that the object is positioned within the interior of the frame below the top surface and a second position such that the object is positioned at least partially above the top surface of the frame.

Lance et al. U.S. Pat. No. 6,422,629 describes a vehicle mounted storage unit adapted to be mounted to a floor portion of a vehicle having a sidewall and a wheel well that extends outwardly from the sidewall by a first distance, includes a mounting bracket fixed to the floor portion of the vehicle and a plurality of connecting members that connect the mounting bracket to the floor portion. The mounting bracket has a width that is less than the first distance, and the mounting bracket is fixed to the floor portion of the vehicle at a mounting point adjacent the sidewall of the vehicle and adjacent the wheel well of the vehicle. The storage unit is provided with a cabinet that is attachable to the mounting bracket, with the cabinet being removable from the mounting bracket and having a width not greater than the first distance. The cabinet is adapted to be mounted adjacent the sidewall of the vehicle and adjacent the wheel well of the vehicle, with no portion of the cabinet extending beyond the wheel well of the vehicle. The storage unit is also provided with a quick-release mechanism that facilitates attachment of the cabinet to the mounting bracket and release of the cabinet from the mounting bracket, the quick-release mechanism allowing the cabinet to be mounted to the mounting bracket and removed from the mounting bracket without the use of a tool.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention provides an improved utility table and storage apparatus for use in vehicles such as pickup trucks having a truck bed. The inventive apparatus includes three main parts: a main frame, a rail system, and a tool storage system. The main frame is made up of a frame assembly with four collapsible legs, two in the front and two in the back of the unit. The legs have wheels, and are adjustable in height to allow for load transfer and differences in elevation between the bed and the ground. This forms the support structure for the work table, the top of which is preferably covered by a 4 ft. by 8 ft. piece of metal, plywood, or other suitable material, forming the work surface area of the table. When the main frame/table portion is outside the truck bed, it rests on the four legs with the wheels attached, allowing it to be moved around. The wheels can rotate and swivel, and may be locked with a single foot pedal which stops rotation and swiveling. The rail system consists of three components, the anchor frame, the guide frame, and the transfer frame. The anchor frame is bolted down to the bed of the truck. The guide frame guides the transfer frame during movements of the main frame, and is temporarily bolted to the anchor frame, but can be removed if needed to allow the full use of the 4 ft. by 8 ft. truck bed. Bearings such as V-groove cam followers or other sliding mechanisms between the transfer frame and the main frame enable the back and forth motion and pull-out of the table. The tool storage system consists of toolboxes and storage compartments arranged and affixed in an orderly manner on the main frame/table.

The inventive apparatus solves the problem of how to efficiently carry tools and materials around in a pickup truck by using standard or custom storage boxes attached to the table portion. The table including the tools can easily be moved back and forth from the truck bed to a distance of 6 ft. from the edge of an 8 ft. standard truck bed without having to extend the table legs. This allows quick access to tools stored in the front of the table. Complete removal of the table requires the use of the four support legs. All the tool boxes can quickly be removed from the table; thus the table can be used as a 4 ft. by 8 ft. work table, or as a worker's platform. Only a portion of the anchor frame is left in the truck; this leaves the truck sufficiently free to pick up 4 ft. by 8 ft. pieces of sheetrock, plywood, or other building materials.

The table, including all tool boxes, can easily be pulled off the truck and stored in the garage during bad weather. To allow easy access to the front portion of the table, it can be rotated 180° around a vertical axis and inserted the other way into the bed of the truck. The legs drop quickly to the ground and are easily adjusted to compensate for differences in height between the truck bed and the ground during insertion and removal of the apparatus.

The legs on the table can easily be collapsed. Thus the work table will be about 4 in. thick and can be carried through narrow openings to be re-deployed at other locations as needed.

The apparatus is securely locked in place (sideways and vertically) while the truck is in motion or resting on a sloping surface. Once the truck tailgate is open, locking handles are used to disengage the locking pins so that the table can be moved forward or backward. Every 12 in. there is a positive stop. The transfer frame can also be moved forward or backward 24 in. and has its own locking pins.

Tools and materials may be stored securely under the truck bed cover. The tool boxes are bolted to the table and can easily be removed. The table and all its components can quickly be removed from the truck and moved to other locations, like the garage or other storage locations at the site. Once the table is outside the truck, it can be used as a work table or a platform.

The inventive apparatus thus provides a tool storage arrangement system using multiple storage boxes and containers unique to each trade, or each person's individual need. It is also a transport system to facilitate bringing the tools from the garage to the site. In addition, it is a work table to be deployed at the construction site or home. The tool table can be inserted either way into the truck, and pulled out 6 ft. without using the legs. One person can load the tools onto the truck, and back into the garage. Positioning of a lumber rack in the stake pockets of a pickup truck can easily be facilitated by using the tool table as an extra hand and a simple load/unload transfer mechanism between the table and the lumber rack.

The inventive apparatus may be modified for other applications such as, but not limited to, a recreation truck setup, a communication station, a medical emergency vehicle, a military readiness vehicle, or a party/barbequing setup vehicle.

It is therefore an object of the present invention to provide a new and improved tool storage apparatus.

It is another object of the present invention to provide a new and improved utility table that can be easily transported.

A further object or feature of the present invention is a new and improved utility table that can also be used as a work platform.

An even further object of the present invention is to provide a novel utility table and tool storage apparatus for use in vehicles such as pickup trucks having a truck bed.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a perspective view of a utility table and tool storage apparatus of this invention, illustrating the main frame/table portion having been removed from the bed of a pickup truck, with the legs of the table extended;

FIG. 2 is a top plan view of the main frame and rail system of the utility table and tool storage apparatus of this invention, illustrating the main frame secured in the bed of the pickup truck, with the legs retracted;

FIG. 3 is an end elevation view of one side of the main frame and rail system, illustrating the anchor frame, guide frame, and transfer frame components of the rail system;

FIGS. 4A–4D are a series of side elevation views illustrating the main frame/table portion being deployed from the pickup truck bed: FIG. 4A shows the main frame fully retracted into the truck bed; FIG. 4B shows the main frame partially extended; FIG. 4C shows the main frame further extended and the rear legs extended; and FIG. 4D shows the main frame fully extended and the front and rear legs extended; and FIG. 5 is a rear perspective view illustrating a tool storage system arranged on the main frame/table portion.

DETAILED DESCRIPTION OF THE INVENTION

Referring to FIGS. 1 through 5, wherein like reference numerals refer to like components in the various views, there is illustrated therein a new and improved utility table and storage apparatus for truck beds, generally denominated 10 herein.

FIG. 1 is a perspective view of a first preferred embodiment of a utility table and tool storage apparatus 10 of this invention, illustrating the main frame/table portion 20 having been removed from the bed B and tailgate T of a pickup truck, and with the legs 22 of the table extended to support it on the ground.

The main frame 20 is preferably made up of an aluminum frame assembly, with overall dimensions of 3 in. thick, 4 ft. wide and 8. ft long. It has four collapsible legs 22, two in the front and two in the back of the unit. The legs have casters or wheels 24 attached to them, and are adjustable in height (as by a winch, screw, hydraulics, or other means) to allow for differences in elevation between the bed and the ground. The frame forms the support structure for the work table, the top of which may be covered by a 4 ft. by 8 ft. piece of metal, polycarbonate, plywood, or other suitable material (not shown), forming the work surface area of the table.

When the main frame/table portion 20 is outside the truck bed, it rests on the four legs 22 with the wheels attached, allowing it to be moved around. The wheels can rotate and swivel, and may be locked with a single foot pedal which stops rotation and swiveling.

FIG. 2 is a top plan view of the main frame 20 and rail system 30 of the utility table and tool storage apparatus of this invention, illustrating the main frame 20 secured in the B bed of the pickup truck, with the legs 22 retracted and folded beneath and within the main frame 20. FIG. 3 is an end elevation view of one side of the main frame and rail system, illustrating the anchor frame 40, guide frame 50, and transfer frame 60 components of the rail system.

The rail system 30 consists of three components, the anchor frame 40, the guide frame 50, and the transfer frame 60. The anchor frame 40 is bolted down to the bed B of the truck. The guide frame 50 guides the transfer frame 60 during movements of the main frame 20. It is temporarily bolted to the anchor frame 40, but can be removed if needed to allow the full use of the 4 ft. by 8 ft. truck bed. The v-groove cam followers 62 between the transfer frame 60 and the main frame 20 make the back and forth motion and pull-out of the apparatus easy to accomplish. FIG. 2 illustrates how the anchor frame 40 is bolted to the truck bed by bolts 42, the location of the six cam followers 62, and the location of the lock pins 32, 64.

The locking system consists of locking the main frame 20 to the transfer frame 60, locking the transfer frame 60 to the guide frame 50, and bolting the anchor frame 40/guide frame 50 to the truck bed. This is accomplished by using spring loaded locking pins 32, 64, and locking bolts 42.

Main frame locking pins 32 (front and rear): This system consists of two locking pins 32 in the front, and two in the rear. Every 12 in. there are matching holes in the transfer frame 60, thus allowing the apparatus to be moved (and locked) 12 in. at a time with respect to the truck bed. Cables and bicycle brake handles (not shown) are used to pull the locking pins out of the matching holes. During reversal of the process, the two rear locking pins are used in a similar manner to the front locking pins.

Transfer frame locking pins 64a,b (first and second positions): This system consists of four pins, two pins 64a at the rear end of the guide frame approximately 6 in. away from the end (first position); and two pins 64b (second position) 24 in. away from the first position. There are two matching holes in the transfer frame 60 at the first position only. By pulling the two pins 64a (first position) out of the matching holes, the transfer frame can be pulled outward 24 in. until the second position locking pins 64 b drop into the matching holes, and lock the transfer frame 60 to the guide/anchor frame 40 again. This allows the transfer frame 60 to extend over the tail gate, and thus makes the pull-out and push-in of the apparatus an easy task. Pulling the two pins 64b (second position) out of the matching holes allows the transfer frame 60 to be completely pulled away from the bed of the truck, and hung off the cam followers, or completely removed if desired.

Removing of guide frame 50 and bolting of anchor frame 40: The guide frame 50 can also be removed from the truck bed. This is accomplished by loosening the anchor frame lock bolts 42, and sliding the guide frame 40 sideways towards the center and removing it from the truck bed. Now the only component left in the truck bed is the anchor frame 40, and there is a 4 ft. wide section freed up for transportation of 4 ft. by 8 ft. wide plywood, sheetrock, or other building materials.

FIGS. 4A–4D are a series of side elevation views illustrating the main frame/table portion being deployed from the pickup truck bed: FIG. 4A shows the main frame 20 fully retracted into the truck bed; FIG. 4B shows the main frame 20 partially extended; FIG. 4C shows the main frame 20 further extended and the rear legs 22 extended; and FIG. 4D shows the main frame 20 fully extended and the front and rear legs 22 extended.

One person alone can handle both the pull-out and push-in operation of the apparatus. With both left and right main frame locking pins 32 (FIGS. 2 and 3) pulled up (e.g., by using cables and bicycle brake handles to lift the locking pins out of the supporting holes), the apparatus is released and can be pulled out from the bed of the pick-up truck. The two rear legs 22 are released and lowered as shown in FIG. 4C. If any adjustment is needed to the height of the legs, it is easily accomplished (e.g., by turning the handles of the adjustable-height leg assemblies). Thus the height of the apparatus can be raised or lowered as needed to transfer the load from the truck to the legs. When the table is pulled further outward and the front portion is resting on the transfer frame 60, the two front legs 22 are lowered as shown in FIG. 4D, and are adjusted in height in a manner similar to the rear legs.

Pushing the table back into the truck bed can also be accomplished by one person. The operator simply aligns the unit with the transfer frame 60, which extends at this point to the edge of the tail gate T, and adjusts the height of the legs (if necessary) to transfer the weight from the legs to the truck bed, folds up the legs and then pushes the apparatus inward until the two rear legs need to be folded up. The two rear legs are released similar to the front ones, than folded up into place, and the apparatus is pushed in all the way, locked in position, and the tailgate T closed.

FIG. 5 is a rear perspective view illustrating a tool storage system 70 arranged on the main frame/table portion. The tool storage system may consist of toolboxes and storage compartments arranged in an orderly manner, allowing storage of construction tools for contractors and others. This figure shows a typical useful storage arrangement setup. It consists of two storage boxes 72, one slide drawer storage unit 74, and three polyethylene storage bins 76. These are bolted down to the surface material of the main frame, and can easily be removed to free up the 4 ft. by 8 ft. full size work table.

The typical containers shown are all made by American Van Equipment. The storage box 72 is a "Patriot" low profile side mount box, made of aluminum diamond plate material: PIB-48, dimensions 48"×13"×7"×14"×10"×48.75"×14.75"; the drawer storage unit 74 is AV-2450, dimensions 24"× 50"×6"; and the polyethylene storage bins 76 are NDC 3060, dimensions 22.4"×17.4"×6".

A lid 78 (such as made by Gaylord's Inc.) covering the total bed of the truck with hinges at the front on both sides is also part of the design, thus allowing the tools to be stored waterproof inside the bed. Materials of construction are standard aluminum type channels, angle or box items, with diamond plated aluminum for the toolboxes and PVC for the storage bins. If needed, the apparatus can be shipped in smaller containers to the consumers and assembled at home with bolts, locking nuts and pins.

The convenience of removing the main frame/table portion from the truck makes the truck available for other tasks. The toolboxes can be stored either in the garage or at the construction site. The tool storage system, with all the toolboxes, can also quickly be removed from the main frame system and set aside. It is also possible to have tool storage only in portion of the available area, and use the other portion for larger equipment, or a work surface.

When the apparatus is going to be used as a work table, or work platform, all the tools including boxes are removed, and a movable and collapsible work surface is available at the construction site or home.

The main benefits of this arrangement system are that the tools, boxes and the apparatus itself can be stored in a garage when not in use. For a contractor, the unique toolboxes can be sitting on the apparatus and loaded onto the truck whenever needed. At the construction site the toolboxes can be set aside and locked up if needed and the truck used for other purposes. The worktable can be used alone or as support for the toolboxes. The apparatus can easily be taken back home whenever the contractor so desires. The storage boxes can be made to fit each individual contractors need.

The benefits and unique design features of the inventive apparatus include, but are not limited to:

Usefulness—load and unload tool boxes tool and worktable by one person.

Mobility—move around from truck to garage with legs on wheels.

Uniqueness—custom designed storage bins for every skilled labor professional.

Transportability—drive it around anywhere the truck will go.

Collapsibility—worktable outside the truck bed and collapsed while stored in the truck bed.

Multi-Purpose Features—store tools or use the truck bed for other hauling purposes.

Dry Storage—tools can be stored in a dry environment while not in use.

Worktable—can be used as a worktable at the construction site or home.

Profits—use of the apparatus increases efficiency, which inevitably leads to greater profits.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. A utility table and storage apparatus for use in vehicles having a truck bed, said apparatus comprising:
   a main frame portion including a frame assembly with four collapsible legs and an upper surface forming a table;
   a rail system including an anchor frame portion secured to the truck bed, a guide frame portion secured to said anchor frame portion, and a transfer frame portion, said guide frame portion including locking pins for locking engagement with said transfer frame portion; and
   bearing means between said transfer frame portion and said main frame portion to facilitate removal of said main frame from said transfer frame.

2. The utility table and storage apparatus of claim 1 further including a tool storage portion on said main frame portion upper surface.

3. The utility table and storage apparatus of claim 2 wherein said tool storage portion comprises storage boxes.

4. The utility table and storage apparatus of claim 2 wherein said tool storage portion comprises slide drawers.

5. The utility table and storage apparatus of claim 2 wherein said tool storage portion comprises storage bins.

6. The utility table and storage apparatus of claim 1 wherein said bearing means comprises a sliding mechanism.

7. The utility table and storage apparatus of claim 6 wherein said sliding mechanism comprises a v-groove cam follower.

8. The utility table and storage apparatus of claim 1 wherein said legs are adjustable in height.

9. The utility table and storage apparatus of claim 1 wherein said legs include wheels.

10. The utility table and storage apparatus of claim 1 wherein said main frame portion includes means for locking engagement with said transfer frame portion.

11. The utility table and storage apparatus of claim 10 wherein said means for locking engagement comprises locking pins.

12. The utility table and storage apparatus of claim 11 wherein said locking pins are adapted to engage complementary holes in said transfer frame portion.

13. The utility table and storage apparatus of claim 12 wherein said complementary holes are spaced along the length of said transfer frame portion.

14. The utility table and storage apparatus of claim 1 wherein said locking pins are adapted to engage complementary holes in said transfer frame portion.

15. The utility table and storage apparatus of claim 14 wherein said complementary holes are spaced along the length of said transfer frame portion.

\* \* \* \* \*